US012766843B2

(12) United States Patent
Mizutani et al.

(10) Patent No.: US 12,766,843 B2
(45) Date of Patent: Oct. 20, 2026

(54) LIQUID SUPPLY CONTAINER AND METHOD OF MANUFACTURING THE SAME

(71) Applicant: SEIKO EPSON CORPORATION, Tokyo (JP)

(72) Inventors: Tadahiro Mizutani, Shiojiri (JP); Atsushi Kobayashi, Matsumoto (JP); Shun Oya, Kiso-machi (JP)

(73) Assignee: SEIKO EPSON CORPORATION, Tokyo (JP)

( * ) Notice: Subject to any disclaimer, the term of this patent is extended or adjusted under 35 U.S.C. 154(b) by 241 days.

(21) Appl. No.: 18/621,690

(22) Filed: Mar. 29, 2024

(65) Prior Publication Data

US 2024/0326454 A1 Oct. 3, 2024

(30) Foreign Application Priority Data

Mar. 30, 2023 (JP) ................................ 2023-055014

(51) Int. Cl.
*B41J 2/175* (2006.01)
*B65D 47/04* (2006.01)
*B65D 53/02* (2006.01)

(52) U.S. Cl.
CPC .......... *B41J 2/17509* (2013.01); *B65D 47/04* (2013.01); *B65D 53/02* (2013.01)

(58) Field of Classification Search
CPC ....... B41J 2/17509; B65D 47/04; B65D 53/02
USPC ........................................................... 141/21
See application file for complete search history.

(56) References Cited

U.S. PATENT DOCUMENTS

| | | | | |
|---|---|---|---|---|
| 11,584,132 | B2 | 2/2023 | Nagai et al. | |
| 11,708,197 | B2 | 7/2023 | Nagaoka et al. | |
| 2019/0299624 | A1* | 10/2019 | Mizutani | B41J 2/17553 |
| 2020/0238713 | A1* | 7/2020 | Ishizawa | B41J 2/17523 |
| 2021/0268804 | A1* | 9/2021 | Osborne | F16K 24/04 |
| 2022/0016893 | A1 | 1/2022 | Nagai et al. | |
| 2022/0227137 | A1* | 7/2022 | Fukasawa | B41J 2/17509 |
| 2022/0267059 | A1 | 8/2022 | Nagaoka et al. | |
| 2023/0322449 | A1 | 10/2023 | Nagaoka et al. | |

FOREIGN PATENT DOCUMENTS

| | | | |
|---|---|---|---|
| EP | 3 939 794 | A1 | 1/2022 |
| EP | 4 049 844 | A1 | 8/2022 |
| JP | 2022-018712 | A | 1/2022 |
| JP | 2022-129862 | A | 9/2022 |

* cited by examiner

*Primary Examiner* — Christopher M Afful
(74) *Attorney, Agent, or Firm* — Oliff PLC

(57) ABSTRACT

A liquid supply container includes a liquid inlet/outlet portion forming member including a cylindrical portion attached to an opening end of a storage portion configured to contain liquid. An inlet/outlet portion of liquid for the storage portion is formed in the cylindrical portion, and an valve is disposed in the inlet/outlet portion. A valve body of the valve is movably accommodated in a holder member. The cylindrical portion of the liquid inlet/outlet portion forming member forms a void portion surrounding the holder member in a circumferential direction between the cylindrical portion and the holder member. A rib or a flange portion is provided for dividing the void portion into at least two portions in the circumferential direction or a moving direction of the valve body.

10 Claims, 11 Drawing Sheets

| ON-OFF VALVE WITH VALVE BODY MOVED UPWARD TO SEATING POSITION (VIEW FROM DIRECTION OF ARROW V) | ON-OFF VALVE WITH VALVE BODY MOVED DOWNWARD TO UNSEATING POSITION (VIEW FROM DIRECTION OF ARROW V) |
| --- | --- |
|  |  |

LIQUID SUPPLY CONTAINER AND METHOD OF MANUFACTURING THE SAME

The present application is based on, and claims priority from JP Application Serial Number 2023-055014, filed Mar. 30, 2023, the disclosure of which is hereby incorporated by reference herein in its entirety.

BACKGROUND

1. Technical Field

The present disclosure relates to a liquid supply container.

2. Related Art

A liquid supply container for supplying liquid to an apparatus using liquid is used in various fields such as an ink jet printer. Such a liquid supply container needs to previously pour the liquid into an empty container to be filled with the liquid, and holds the liquid filled in the container, and discharges the liquid to the apparatus in a state of being attached to the apparatus. For this reason, the liquid supply container is required to have an inlet and an outlet for allowing the liquid to flow in and out and for holding the liquid. In the liquid supply container disclosed in the following JP-A-2022-018712, a valve using a spring is provided inside such a member through which the liquid flows in and out, so that the container can be sealed to prevent the liquid from being accidentally ejected.

In such a liquid supply container, when the liquid is poured into the container, it is necessary to discharge the gas in the container to the outside. When the internal gas cannot be efficiently discharged, it is considered that pouring of liquid takes time and effort. However, sufficient studies have not been made on effective countermeasures against such factors that hinder the discharge of the internal gas, including JP-A-2022-018712. In addition, when a new liquid is poured, a discharging operation is performed in advance so that an unused liquid, a cleaning liquid, or the like does not remain in the container, but it cannot be said that a structure in which the liquid hardly remains in the container has been sufficiently studied. As described above, the behavior of fluids such as the gas or the liquid in the liquid supply container has not been sufficiently studied.

SUMMARY

The present disclosure can be implemented as the following forms or application examples.

One embodiment of the present disclosure is a form as a liquid supply container. The liquid supply container includes: a storage portion configured to contain liquid; a liquid inlet/outlet portion forming member disposed at an opening end of the storage portion and including a cylindrical portion forming an inlet/outlet portion of the liquid with respect to the storage portion; a valve disposed in the inlet/outlet portion and opening/closing communication between the storage portion and an outside; a holder member attached to an inside of the cylindrical portion and movably accommodating at least a valve body of the valve; and a seal member disposed in the liquid inlet/outlet portion forming member and constituting the valve together with the valve body, the valve body configured to be moved away from the seal member to make an opening portion communicating with the outside be in an open state and configured to be seated on the seal member to make the opening portion be in a closed state. Here, the cylindrical portion of the liquid inlet/outlet portion forming member forms a void portion between the cylindrical portion and the holder member, the void portion surrounding the holder member in a circumferential direction, and the void portion includes a rib that divides the void portion into at least two portions in the circumferential direction.

Another embodiment of the present disclosure is a form as a liquid supply container. The liquid supply container includes: a storage portion configured to contain liquid, a liquid inlet/outlet portion forming member disposed at an opening end of the storage portion and including a cylindrical portion forming an inlet/outlet portion of the liquid; a valve disposed in the inlet/outlet portion and opening/closing communication between the storage portion and an outside; a holder member attached to an inside of the cylindrical portion and movably accommodating at least a valve body of the valve, and a seal member disposed in the liquid inlet/outlet portion forming member and constituting the valve together with the valve body, the valve body configured to be moved away from the seal member to make an opening portion communicating with the outside be in an open state and configured to be seated on the seal member to make the opening portion be in a closed state. Here, the cylindrical portion of the liquid inlet/outlet portion forming member forms a void portion surrounding the holder member in a circumferential direction between the cylindrical portion and the holder member, and a flange portion is disposed in the void portion, the flange portion dividing the void portion into at least two portions in a moving direction of the valve body.

Still another embodiment of the present disclosure is a form as a liquid supply container. The liquid supply container includes: a storage portion configured to contain liquid; a liquid inlet/outlet portion forming member disposed at an opening end of the storage portion and including a cylindrical portion forming an inlet/outlet portion of the liquid; a valve disposed in the inlet/outlet portion and opening/closing communication between the storage portion and an outside; a holder member attached to an inside of the cylindrical portion and movably accommodating at least a valve body of the valve; and a seal member disposed in the liquid inlet/outlet portion forming member and constituting the valve together with the valve body, the valve body configured to be moved away from the seal member to make an opening portion communicating with the outside be in an open state and configured to be seated on the seal member to make the opening portion be in a closed state. Here, the liquid inlet/outlet portion forming member includes a step portion, the step portion configured to form a recessed portion accommodating the seal member on a side opposite to a joining portion with the storage portion, the holder member includes a seal member pressing portion that is secured to an inner peripheral wall of the recessed portion, the seal member pressing portion configured to press down the seal member accommodated in the recessed portion, and when a side closer to the opening portion in a moving direction of the valve body is defined as a tip side and a side closer to the storage portion is defined as a rear end side, a rear end of the seal member pressing portion is positioned further on the rear end side than a rear end of the seal member and a rear end of the step portion is positioned further on the rear end side than the rear end of the seal member pressing portion.

DESCRIPTION OF EMBODIMENTS

A. First Embodiment

Figure 1:
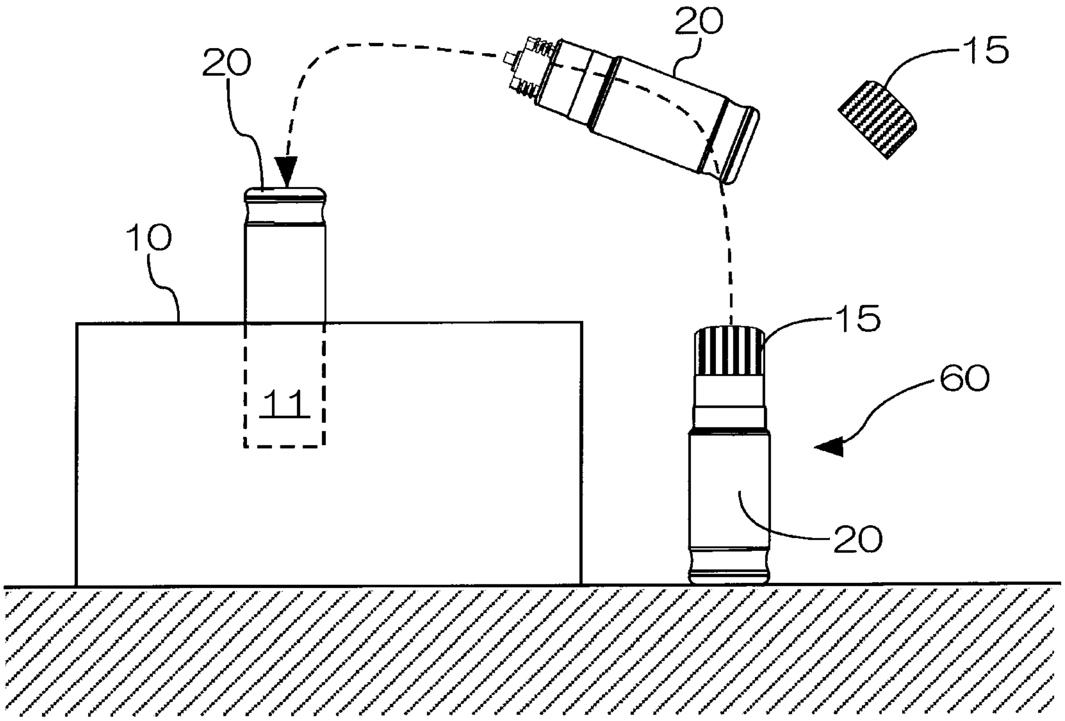
FIG. 1 is an explanatory view illustrating a method of using a liquid supply container.

A1. Method of Using a Liquid Supply Container:

FIG. 1 illustrates a method of using a liquid supply container 20 of the present embodiment. The liquid supply container 20 with a cap 15 attached thereto is referred to as a supply container 60. The supply container 60 contains liquid, here, ink used for a printer 10 therein, and stores the ink in the liquid supply container 20, in a state where the cap 15 is attached, in a posture in which the cap 15 is on an upper side (hereinafter, referred to as an upright posture). When it is used, the cap 15 is removed, and the liquid supply container 20 is turned upside down, that is, in an inverted posture to be mounted on a mounting portion 11 prepared in the printer 10. In this inverted posture, the ink in the liquid supply container 20 is supplied to the printer 10. After use, the liquid supply container 20 is removed from the printer 10. The cap 15 may be omitted from the supply container 60. The liquid contained in the liquid supply container 20 is not limited to ink, and may be a medicine, water, a beverage, or the like. An apparatus in which the liquid supply container 20 is used is not limited to a printer, and the liquid supply container 20 can be used in various apparatuses such as a fixed-amount discharge apparatus of a medicine and a dispenser of a beverage.

Figure 2:
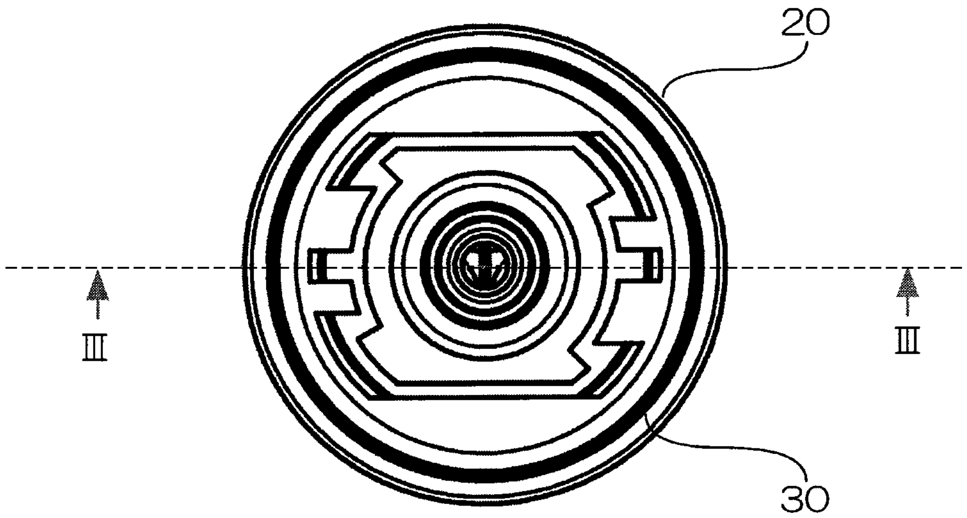
FIG. 2 is a top view of a liquid supply container of a first embodiment.
Figure 3:
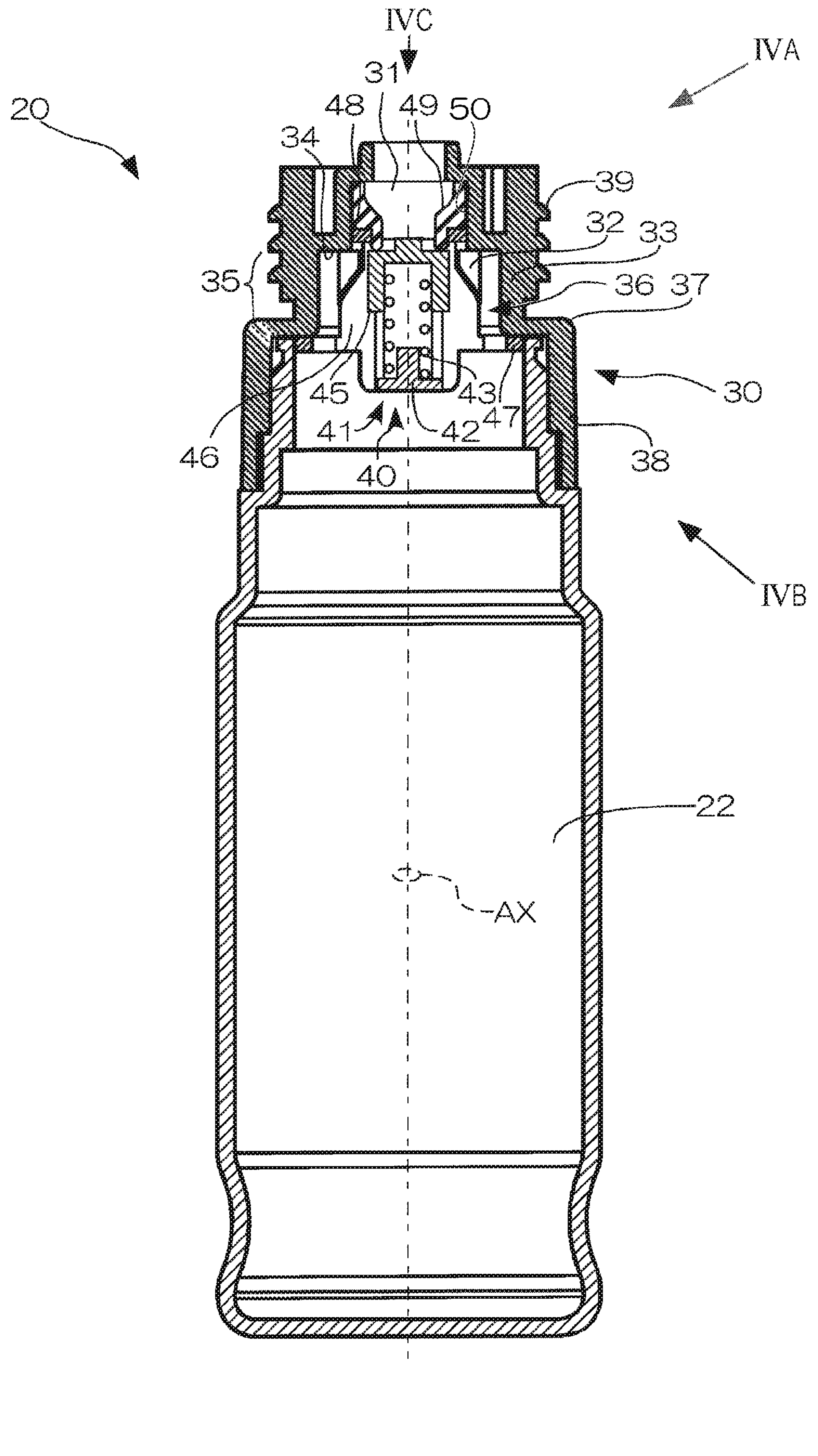
FIG. 3 is a cross-sectional view taken along line III-III of FIG. 2.

A2. Structure of Liquid Supply Container:

FIG. 2 is a top view of the liquid supply container 20, and FIG. 3 is a cross-sectional view taken along line III-III in FIG. 2. In the following description, an attachment side of the cap 15 in the upright posture is referred to as an upper side or an upper direction, and a side opposite to the cap 15 side in the upright posture is referred to as a lower side or a lower direction. When the up-and-down direction is not particularly considered, it may be referred to as a vertical direction. This direction corresponds to a moving direction in which a valve body 45 of an valve 40 described later moves for opening/closing. The liquid supply container 20 has a substantially cylindrical shape, and when a vertical relationship in a direction along a central axis AX of the cylinder is taken into consideration, this may be referred to as a height direction. Further, a direction passing through the central axis AX and orthogonal to the central axis AX is referred to as a radial direction regardless of a direction with respect to the central axis. Here, the shape of the liquid supply container 20 is a cylindrical shape, but the shape is not limited to a cylinder.

As illustrated, the liquid supply container 20 includes a storage portion 22 for containing ink, a liquid inlet/outlet portion forming member 30 attached to an opening end of the storage portion 22, and the valve 40 provided inside the liquid inlet/outlet portion forming member 30. In a state where the valve 40 is attached to the inside, the liquid inlet/outlet portion forming member 30 is integrated with the storage portion 22 by fixing an attachment portion 38 to the opening end of the storage portion 22. Although the storage portion 22 is made of metal in the present embodiment, all or a part of the storage portion 22 may be made of synthetic resin or glass. When the synthetic resin or glass is used, all or a part thereof may be transparent or translucent so that a filling amount and a color of the contained liquid, a liquid state, and the like can be confirmed. In this way, it is possible to recognize the color of the contained ink, and it is possible to make it difficult for erroneous mounting of the liquid supply container 20 to occur when mounting the liquid supply container 20 containing ink of each color in the printer 10 performing multicolor printing.

The liquid inlet/outlet portion forming member 30 is a member having a tubular shape, here, a cylindrical shape, and includes a stepped portion 37 at a region to be attached to the opening end of the storage portion 22. In the liquid inlet/outlet portion forming member 30, a diameter of the attachment portion 38 attached to the opening end of the storage portion 22 is the largest, and an inlet/outlet portion 35 having a small inner diameter is formed by the stepped portion 37. An opening portion 31 having an inner diameter smaller than that of the inlet/outlet portion 35 is formed on a side opposite to the attachment portion 38 of the liquid inlet/outlet portion forming member 30. The inlet/outlet portion 35 and the opening portion 31 are coupled to each other via the step portion 34. As illustrated in the drawing, the inlet/outlet portion 35 provides a space, in a range from the step portion 34 to the stepped portion 37, in which the valve 40 is disposed to perform pouring of the liquid and when necessary, discharge of the liquid. The space of the inlet/outlet portion 35 is formed by a cylindrical portion 33 which is a cylindrical region of the liquid inlet/outlet portion forming member 30. A void portion 36 is formed between the cylindrical portion 33 of the liquid inlet/outlet portion forming member 30 and the valve 40 disposed in the inlet/outlet portion 35. The form of the void portion 36 will be described in detail later. A fitting portion 39 into which the cap 15 is fitted is formed on an upper outer periphery of the liquid inlet/outlet portion forming member 30.

The opening portion 31 is used to allow the ink contained in the storage portion 22 to flow out in the inverted posture illustrated in FIG. 1 or to pour the ink into the liquid supply container 20 in the upright posture. The opening portion 31 is provided with a step in the middle in the height direction, and is divided into two portions having different dimensions in the radial direction, in which a diameter of a lower half portion is larger than a diameter of an upper half portion. The upper half of the opening portion 31 is referred to as an upper chamber, and the lower half is referred to as a lower chamber. The upper chamber is prepared as a space for inserting a flow path member to be described later. A seal member 49 is accommodated in the lower chamber. The seal member 49 is a part of the valve 40 described later, and functions as a valve seat in the valve 40. The seal member 49 is formed, of a flexible material, into a shape having an opening at the center portion, thereby making the valve 40 be in a closed state when the valve body 45 comes into contact with and adheres to the seal member 49, and making the valve 40 be in an open state communicating with the outside via the opening inside when the valve body 45 is separated therefrom.

The seal member 49 is pressed by a seal member pressing portion 48 provided in a holder member 41, and the pressing structure and the like will be described together with a structure and a function of the valve 40 described below.

A3. Configuration and Functions of Valve:

The valve 40 provided inside the liquid inlet/outlet portion forming member 30 includes a spring seat 42 provided at a lower end portion of the holder member 41 centered on the valve body 45 movably attached to the holder member 41, a spring 43 interposed between the spring seat 42 and the valve body 45, and the above-described seal member 49. The spring 43 applies an upward force to the valve body 45 in a state of being compressed from a natural length. Applying a force to an object in contact with an elastic body such as a spring by the elastic body is referred to as "biasing" or "bias" in this specification. The valve body 45 is biased in a direction of the seal member 49 by the spring 43, and when there is nothing to block the movement of the valve body 45, the valve body 45 rises and comes into contact with the seal member 49. The valve body 45 is provided with a substantially triangular top portion 45*a*. The top portion 45*a* has an outer shape smaller than an inner diameter of the seal member 49. When an outer flat portion of the top portion 45*a* of the valve body 45 comes into contact with a lower end of the seal member 49, the top portion 45*a* enters an inside of the seal member 49. A state in which the flat portion of the valve body 45 is in contact with the lower end of the seal member 49 is referred to as seating in accordance with the operation of the valve 40. At this time, an opening of the seal member 49 is in the closed state by the seal member 49 and the valve body 45, and the communication with the outside is cut off. A state in which the valve body 45 is moved downward, separated from the seal member 49 and changed from the seating state in which the valve body 45 is in contact with the seal member 49 is referred to as unseating in accordance with the operation of the valve 40.

Figure 4:
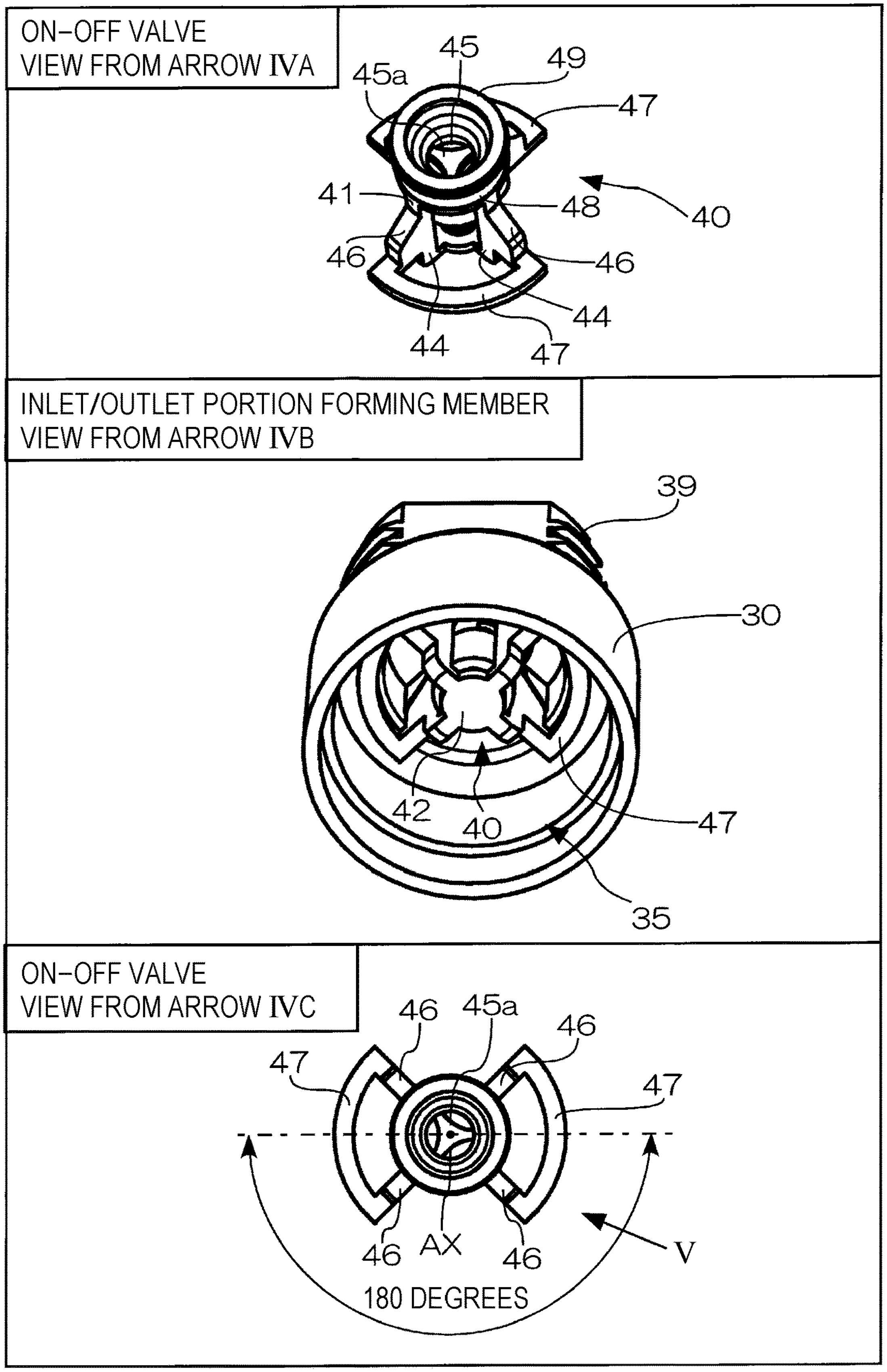
FIG. 4 includes explanatory views illustrating a form of an valve.

The holder member 41 accommodating the valve body 45 inside includes a holder rib 46, a fixing frame 47, the seal member pressing portion 48, the seal member 49, and the like in addition to the spring seat 42. These configurations will be described with reference to FIG. 4. The upper column of FIG. 4 is a perspective view of the valve 40. This perspective view illustrates a state in which the valve 40 alone is viewed from a direction of an arrow IVA in FIG. 3. In addition, the middle column of FIG. 4 illustrates a state of the liquid inlet/outlet portion forming member 30 when viewed from the storage portion 22 side, that is, when the liquid inlet/outlet portion forming member 30 incorporating the valve 40 is viewed from a direction of an arrow IVB in FIG. 3. Further, the lower column of FIG. 4 is a top view of the valve 40 as viewed from directly above.

As illustrated in the drawings, the seal member 49 is disposed at the uppermost portion of the valve 40, and the seal member pressing portion 48 is disposed below the seal member 49. The seal member pressing portion 48 is supported by four struts 44, and lower ends of the struts 44 are coupled to the spring seat 42. The holder rib 46 projects radially outer side from the strut 44. Lower ends of two adjacent holder ribs 46 are coupled to each other by the fixing frame 47. As a result, as illustrated in the lower column of FIG. 4, the two fixing frames 47 are disposed at positions opposite by 180 degrees around the central axis AX, that is, at positions opposed to each other with the central axis in between.

When the liquid supply container 20 is assembled, before attaching to the storage portion 22, the valve 40 is inserted inside the liquid inlet/outlet portion forming member 30 from a lower opening, and the seal member 49 is disposed in the lower chamber of the opening portion 31. In this state, the valve 40 is pressed upward, and the fixing frame 47 is welded to an inner side of the stepped portion 37 of the attachment portion 38. When the fixing frame 47 is welded to the inner side of the stepped portion 37, the position around the central axis is a position where the four holder ribs 46 face four upper ribs 32 provided on an inner side of the liquid inlet/outlet portion forming member 30. The holder rib 46 on the valve 40 side and the upper rib 32 on the inner side of the liquid inlet/outlet portion forming member 30 face each other via a slight clearance, thereby dividing the void portion 36 inside the liquid inlet/outlet portion forming member 30 into four portions.

Figure 5:
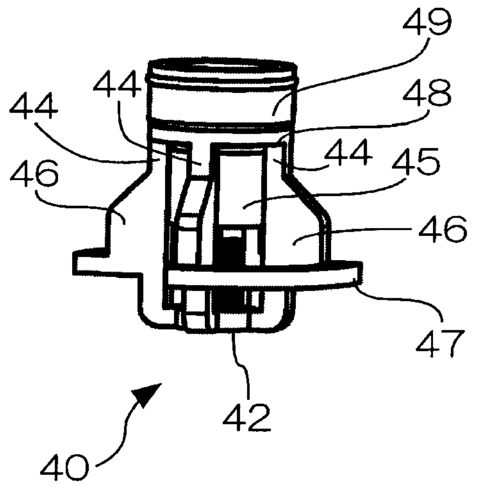
FIG. 5 includes explanatory views illustrating an operating state of the valve.
Figure 5:
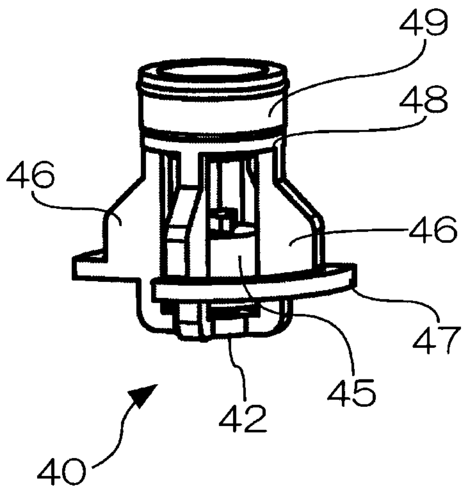

When the fixing frame 47 of the valve 40 is welded to the inner side of the stepped portion 37 of the attachment portion 38, the seal member pressing portion 48 at the upper portion of the valve 40 presses the seal member 49 to fix it to the lower chamber of the opening portion 31. At this time, the valve body 45 of the valve 40 is biased by the spring 43 to be seated on the seal member 49, thereby closing the passage to cut off the communication with the outside. On the other hand, when a liquid pouring flow path member 70, which will be described later, is inserted through the opening portion 31, the valve body 45 is pressed downward by the liquid pouring flow path member 70 and is separated from the seal member 49, and thus the storage portion 22 communicates with the outside. This state is illustrated in FIG. 5. The left column of the figure illustrates a state in which the valve body 45 is moved upward by the biasing force of the spring 43 and is seated. The right column of the figure illustrates a state in which the valve body 45 is moved downward against the biasing force of the spring 43 and is separated. The valve 40 of FIG. 5 is illustrated as viewed from a direction of an arrow V in the lower column of FIG. 4.

Figure 6A:
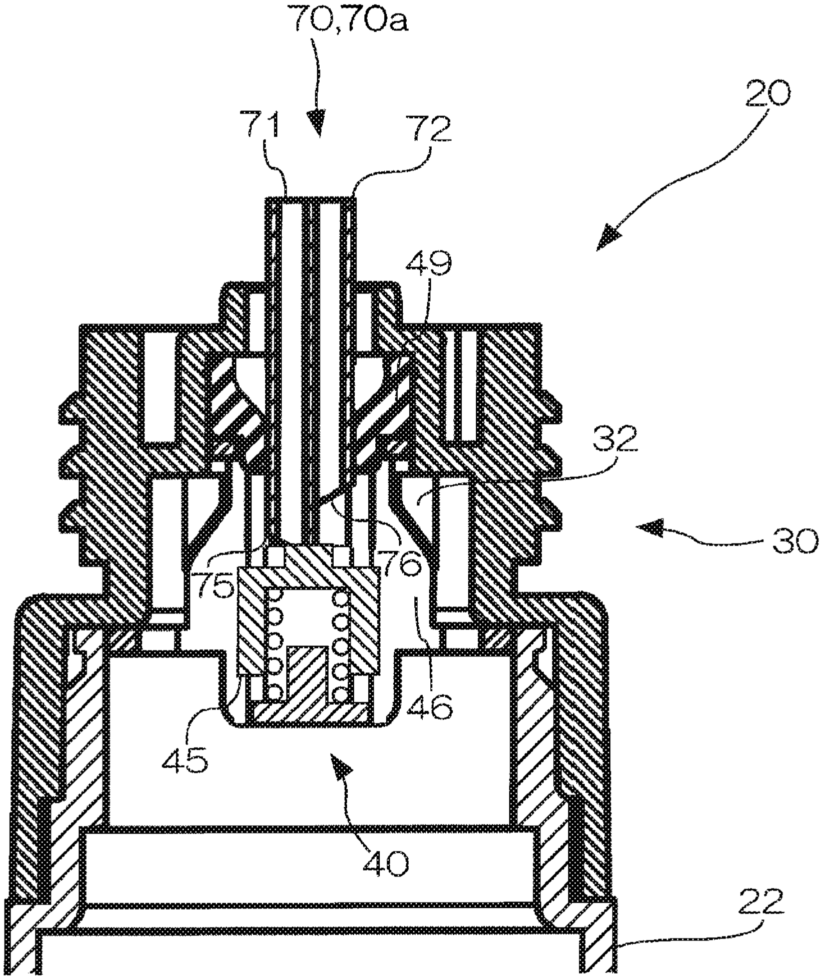
FIG. 6A is a cross-sectional view illustrating a state in which a liquid pouring flow path member is inserted into a liquid inlet/outlet portion forming member to which the valve is attached.

A4. Pouring of Liquid:

A method for pouring ink into the storage portion 22 of the liquid supply container 20 will be described. When the liquid supply container 20 is in the upright state, the valve body 45 of the valve 40 is seated on the seal member 49, and since the valve 40 is in the closed state, the liquid such as ink cannot be poured into the liquid supply container 20 in this state. The pouring of the ink is started by inserting the liquid pouring flow path member 70, 70*a* into the opening portion 31 from above with respect to the liquid supply container 20 in the upright state. The ink pouring operation is illustrated in FIG. 6A. As illustrated in the drawing, when the liquid pouring flow path member 70, 70*a* is inserted downward from the opening portion 31, the tip of the liquid pouring flow path member 70, 70*a* eventually hits the top portion 45*a* of the valve body 45 of the valve 40. As a result, as the liquid pouring flow path member 70, 70*a* descends, the valve body 45 is pushed down, the valve body 45 is separated from the seal member 49, and the valve 40 becomes in the open state.

As illustrated in the drawing, the liquid pouring flow path member 70 includes a liquid flow path 71 and a gas flow path 72. In the present embodiment, the liquid flow path 71 is coupled to an ink pressure feeding device (not illustrated), and receives pressure feeding of ink at a predetermined pressure. The side of the gas flow path 72 opposite to the end portion inserted into the opening portion 31 is coupled to a predetermined negative pressure source. Instead of the coupling to the negative pressure source, it may be simply opened to the atmosphere. The liquid pouring flow path member 70 is formed by sectioning the inside of a single pipe member along a pipe into one used as the liquid flow path 71 and the other used as the gas flow path 72. Of course, two capillaries may be fixed to form one liquid pouring flow path member 70. Alternatively, the liquid flow path 71 and the gas flow path 72 may be configured independently. In this case, the valve body 45 may be pushed down by insertion of the liquid flow path 71. The liquid flow path 71 and the gas flow path 72, which are two flow paths of the liquid pouring flow path member 70, have different heights of lower ends 75 and 76 in the vertical direction, which are the terminal ends of these flow paths. The position of the lower end 76 of the gas flow path 72 is higher than the position of the lower end 75 of the liquid flow path 71. In addition, since the liquid flow path 71 and the gas flow path 72 have a shape juxtaposed in a flow path direction, inflow and outflow directions of the liquid and the gas from the lower ends 75 and 76 are opposite to each other by substantially 180 degrees.

Figure 6B:
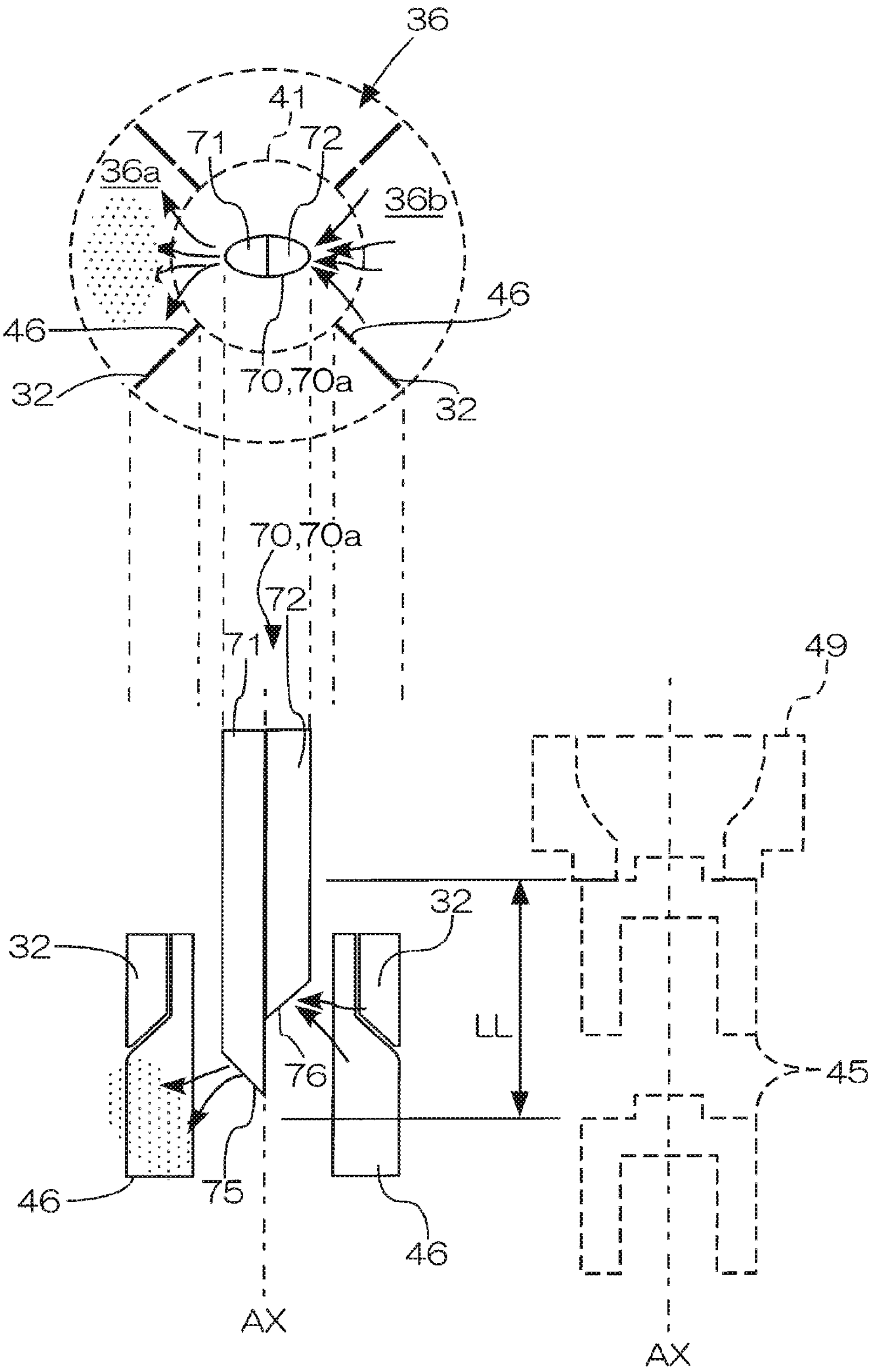
FIG. 6B is an explanatory view schematically illustrating pouring of liquid.

These relationships are schematically illustrated in FIG. 6B. As illustrated in the upper stage of the figure, since the liquid pouring flow path member 70 is present at the center of the valve 40 in plan view, the liquid pouring flow path member 70 is surrounded by the holder member 41. Therefore, the void portion 36 surrounding the holder member 41 is divided into four portions around the central axis by the upper rib 32 and the holder rib 46. Further, the lower stage of the figure illustrates a positional relationship between the liquid pouring flow path member 70 and each of the upper rib 32 and the holder rib 46 in a side view, and the positions in the height direction of the valve body 45 at the seating position and the unseating position are further illustrated on the right side so that the positional relationship with the valve body 45 can be seen. By the insertion of the liquid pouring flow path member 70, the valve body 45 descends from the seating position where the valve body 45 is in contact with the seal member 49 to the unseating position. At least parts of the upper rib 32 and the holder rib 46 are present in a range LL from the lower end of the seal member 49 to the valve body 45 at the unseating position. Therefore, the lower end 75 of the liquid flow path 71 is positioned in one of the void portions 36 partitioned by the upper rib 32 and the holder rib 46. The ink that flows down through the liquid flow path 71 and is discharged to the void portion 36 from the lower end 75 for pouring is directed to the storage portion 22 from a first portion **36*a* that is one of the partitions of the void portion 36. On the other hand, the air, which is the gas to be discharged to the outside of the liquid supply container 20 in place of the ink to be poured, mainly passes through a second portion 36*b* different from the first portion 36*a* of the partitioned void portion 36, and is sucked from the lower end 76 of the gas flow path 72 through the gas flow path 72**.

In this manner, in the pouring of the ink using the liquid pouring flow path member 70, when the pressurized ink is poured into a wide space from a narrow path such as the lower end 75 of the liquid flow path 71, the ink may become minute liquid droplets. The present embodiment suppresses or eliminates the occurrence of a situation in which such minute liquid droplets are sucked into the gas flow path 72 from the lower end 76 of the gas flow path 72, instantaneously block the gas flow path 72, and cause resistance against the pouring of ink from the liquid flow path 71, for the following reasons.

1. Since the lower end 76 of the gas flow path 72 is positioned at a position higher than the lower end 75 of the liquid flow path 71, even when the ink discharged from the lower end 75 becomes minute liquid droplets, they are unlikely to reach the lower end 76 of the gas flow path 72 positioned at a position higher than the lower end 75 of the liquid flow path 71.

2. The lower end 75 and the lower end 76 face substantially opposite directions, and an ink droplet discharged from the lower end 75 is unlikely to reach the lower end 76.

3. Since the void portion 36 around the holder member 41 is divided into four portions by the upper rib 32 and the holder rib 46 in the circumferential direction with respect to the central axis, it is difficult for liquid droplets to pass through and go around the void portion to reach the lower end 76 of the gas flow path 72.

4. In addition, since the void portion 36 around the central axis AX is divided into four portions, two sets of the upper rib 32 and the holder rib 46 are present from the lower end 75 of the liquid flow path 71 to the lower end 76 of the gas flow path 72 by going around the void portion 36, which become a large obstacle to the circulation of the ink.

As described above, when the ink is poured using the liquid pouring flow path member 70, the liquid supply container 20 of the present embodiment makes it unlikely that a situation occurs in which the gas flow path 72 for discharging the gas in the liquid supply container 20 is instantaneously clogged with the liquid droplets of the ink and becomes an obstacle to the pouring of the ink from the liquid flow path 71. Therefore, it is possible to complete the pouring of the ink into the liquid supply container 20 in a short time. In addition, since a discharge direction of the liquid from the liquid flow path 71 and the inflow direction of the gas into the gas flow path 72 are different from each other by substantially 180 degrees, the liquid pouring flow path member 70 can be inserted at any angle around the central axis of the liquid supply container 20. Regardless of the angle of insertion, the upper rib 32 and the holder rib 46 that divide the void portion 36 are always present between the lower ends 75 and 76 of the liquid flow path 71 and the gas flow path 72, and thus handling during ink pouring is simplified.

When the pouring of the ink is finished in this way, the liquid pouring flow path member 70 is pulled out from the liquid supply container 20. As a result, the valve body 45 is raised by the biasing force of the spring 43 and is seated on the seal member 49, thereby making the valve 40 be in the closed state. Therefore, even when the liquid supply container 20 falls down, the ink inside does not leak. In a state where the cap 15 is removed, when the liquid supply container 20 is mounted on the mounting portion 11 of the printer 10 in an inverted posture as illustrated in FIG. 1, a pin (not illustrated) is erected inside the mounting portion 11, and the pin moves the valve body 45 to the spring seat 42 side to make the valve 40 be in the open state. As a result, the ink contained in the storage portion 22 passes through the valve 40 of the inlet/outlet portion 35, flows out from the opening portion 31, and is stored in the ink tank or the like in the printer 10.

B. Second Embodiment

Figure 7:
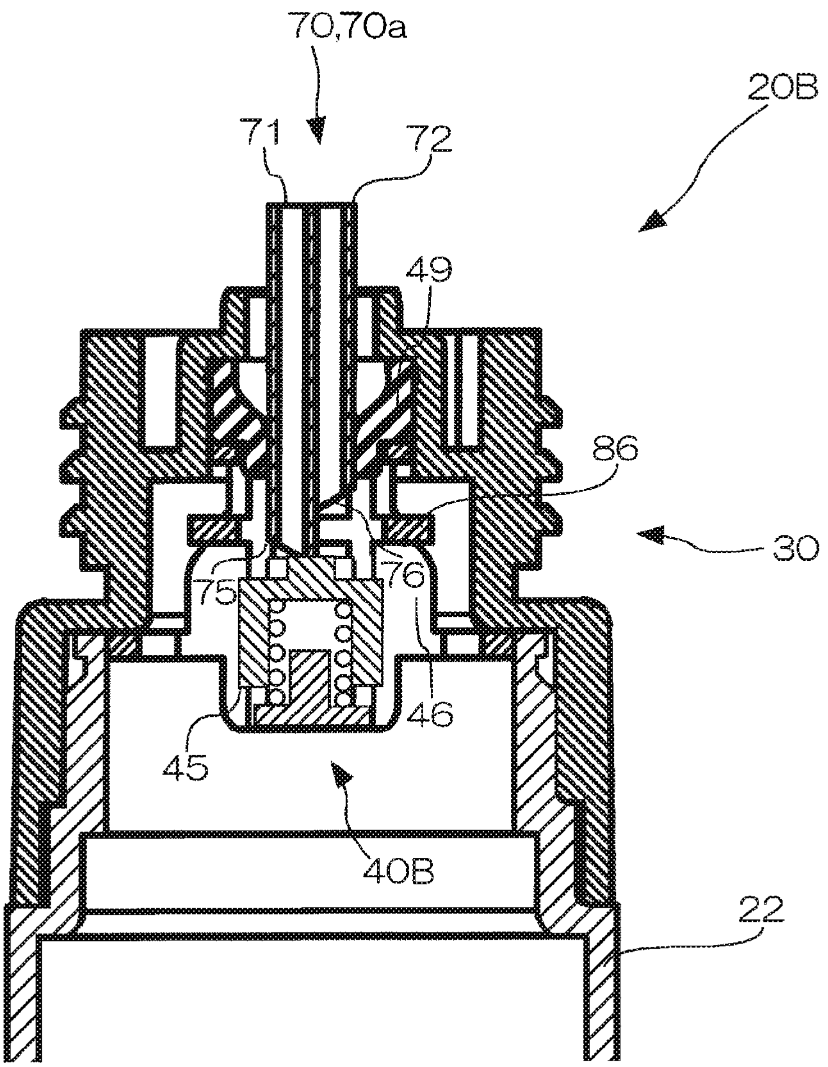
FIG. 7 is a cross-sectional view illustrating a form of a liquid inlet/outlet portion forming member to which an valve is attached in a second embodiment.
Figure 8:
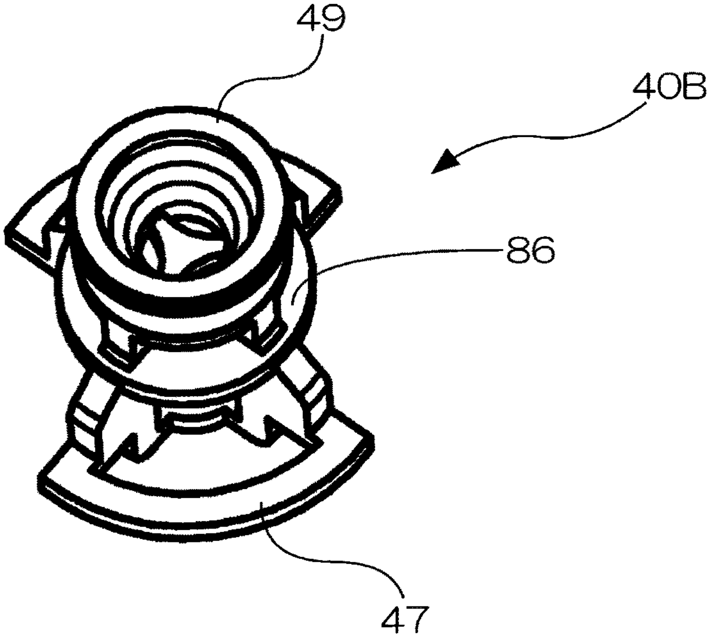
FIG. 8 is a perspective view illustrating a form of the valve used in the second embodiment.

A liquid supply container 20B of a second embodiment has substantially the same configuration as that of the first embodiment, but is different in the configuration for dividing the void portion 36 around the valve. A main section of the liquid supply container 20B of the second embodiment is illustrated in FIGS. 7 and 8. FIG. 7 is an explanatory view illustrating a state, mainly the inlet/outlet portion 35, in which the liquid pouring flow path member 70 is inserted, and FIG. 8 is an enlarged perspective view illustrating an valve 40B. As illustrated in the figure, in the second embodiment, the holder member 41 of the valve 40B is provided with a flange portion 86 that divides the void portion 36 in the vertical direction. In the present embodiment, the upper rib 32 used in the first embodiment is not provided, but the upper rib 32 may be provided at a position corresponding to the holder rib 46. Further, the flange portion 86 may be formed from the upper rib 32 or directly from an inner wall of the cylindrical portion 33 toward the direction of the valve 40B.

In this embodiment, the void portion 36 around the valve 40B is divided into two upper and lower portions by the flange portion 86. The position of the flange portion 86 in the moving direction of the valve body 45 is between the valve body 45 in the unseating state and the seal member 49. Further, when the liquid pouring flow path member 70 is inserted and the valve body 45 is moved down to the position closest to the spring seat 42 side, the lower end 75 of the liquid flow path 71 is positioned at a portion lower than the flange portion 86 defined by the flange portion 86, whereas the lower end 76 of the gas flow path 72 is positioned at a portion higher than the flange portion 86 defined by the flange portion 86. Therefore, even when the ink discharged from the lower end 75 of the liquid flow path 71 becomes minute liquid droplets, it is difficult for the liquid droplets to enter, from one portion divided by the flange portion 86 to other portion, and the instantaneously clogging the gas flow path 72 by the liquid droplets is suppressed. Therefore, the same operation and effects as those of the first embodiment can be achieved.

C. Third Embodiment

Figure 9:
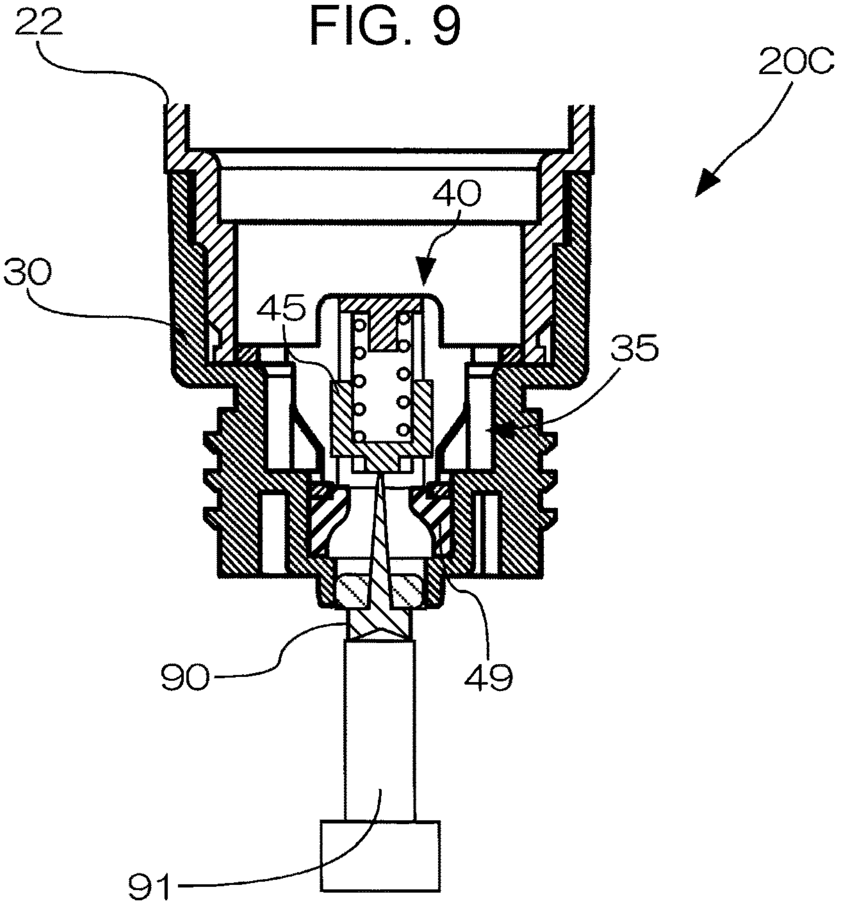
FIG. 9 is an explanatory view illustrating a state in which liquid in the liquid supply container is taken out.

Next, a structure of a liquid supply container 20C according to a third embodiment will be described. In the liquid supply container 20C, as in FIG. 9 illustrating a main section centering on the inlet/outlet portion 35, the liquid in the liquid supply container 20C, for example, ink, may not be completely discharged and may remain. The remaining liquid is considered to be as follows.

A. A case in which the liquid such as ink contained in the storage portion 22 is used even in a correct use state, for example, the container main body is mounted on the mounting portion 11 of the printer 10, but in the inverted posture, a shape serving as a recess is inside so that the liquid accumulated therein is not discharged. This is a case in which the liquid to be originally used remains.

B. A case in which the container main body is collected, for example, when unused ink remains in the container main body passing an expiration date. In this case, it is necessary to discharge the unused ink or the like for reuse.

C. A case in which a cleaning liquid is poured inside the container main body to clean the inside thereof in preparation for reuse of the collected liquid supply container 20. In this case, it is necessary to discharge the cleaning liquid after cleaning.

In such a case, as illustrated in the figure, the liquid supply container 20C is in the inverted posture, and a valve-opening discharge needle 90 is inserted from the opening portion 31 positioned below due to the inverted posture. A lift device 91 is provided at a lower portion of the valve-opening discharge needle 90, and lifts up the valve-opening discharge needle 90 by a predetermined height in response to an instruction. The valve-opening discharge needle 90 lifted up through the opening portion 31 and a hollow portion of the seal member 49 comes into contact with and pushes up the top portion 45*a* of the valve body 45, thereby making the valve 40 be in the open state. As a result, the liquid such as the ink or the cleaning liquid remaining inside the liquid supply container 20C is discharged from between the opening portion 31 and the valve-opening discharge needle 90.

Figure 10:
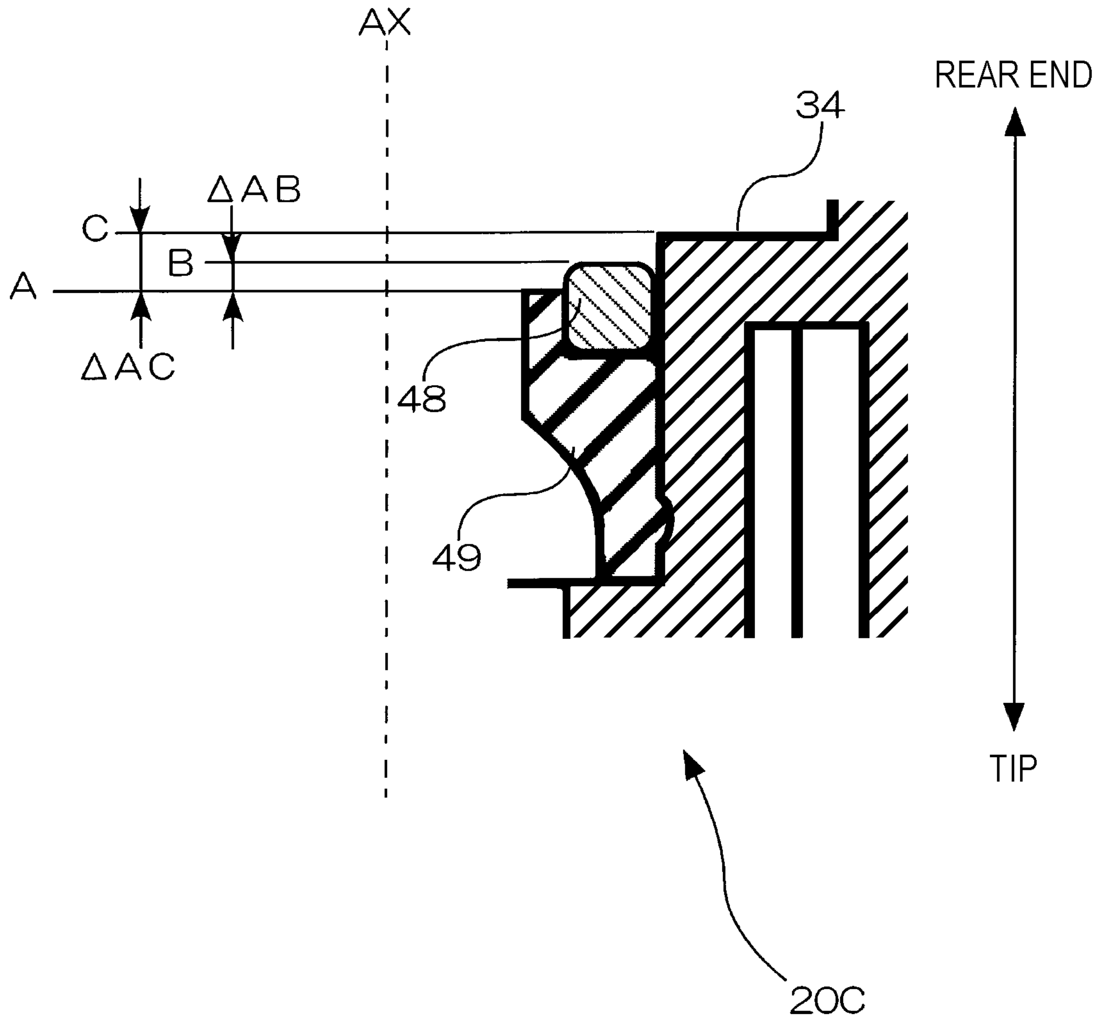
FIG. 10 is an explanatory view illustrating a dimensional relationship around a seal member pressing portion.

The liquid supply container 20C of the third embodiment is manufactured such that the heights of the members in the inlet/outlet portion 35 are designed as follows. The height of each portion is illustrated in FIG. 10. FIG. 10 is an enlarged view of a main section illustrating a height relationship between the seal member 49 and each of the seal member pressing portion 48 and the step portion 34 in a direction along the central axis AX. As illustrated in the figure, when the opening portion 31 side in the moving direction of the valve body 45 is defined as a tip side and the storage portion 22 side is defined as a rear end side, a rear end of the seal member pressing portion 48 is positioned further on the rear end side than a rear end of the seal member 49, and a rear end of the step portion 34 is positioned further on the rear end side than the rear end of the seal member pressing portion 48. Therefore, when a height position of the rear end of the seal member 49 is A, a position B of the rear end of the seal member pressing portion 48 is further on the rear end side than the position A. Further, a position C of the rear end of the step portion 34 on the inner side of the liquid inlet/outlet portion forming member 30 is further on the rear end side than the position B. As a result, a distance ΔAC from the position A of the rear end of the seal member 49 to the position C of the rear end of the step portion 34 is larger than a distance ΔAB from the position A of the rear end of the seal member 49 to the position B of the rear end of the seal member pressing portion 48.

In the liquid supply container 20C designed and manufactured as described above, a member positioned on the radially outer side than the seal member 49 is present at a higher position in the inverted posture. Therefore, when the liquid remains in the liquid supply container 20, it is expected that the liquid at a high position flows to a low position and does not remain or remains in a state of an extremely small amount. In order to further reduce the amount of the remaining liquid, a rear end surface of the seal member 49, a rear end surface of the seal member pressing portion 48, and a rear end surface of the step portion 34 may be inclined toward the direction of the central axis AX. Alternatively, it may also impart water repellency or superhydrophilicity to the surface so that the liquid is less likely to remain on the surfaces.

The liquid supply container 20C according to the third embodiment is advantageous in that the liquid inside can be easily discharged in the inverted posture, and the liquid such as ink or cleaning liquid is less likely to remain inside the liquid supply container 20C.

D. Fourth Embodiment—Method of Manufacturing Container

Figure 11:
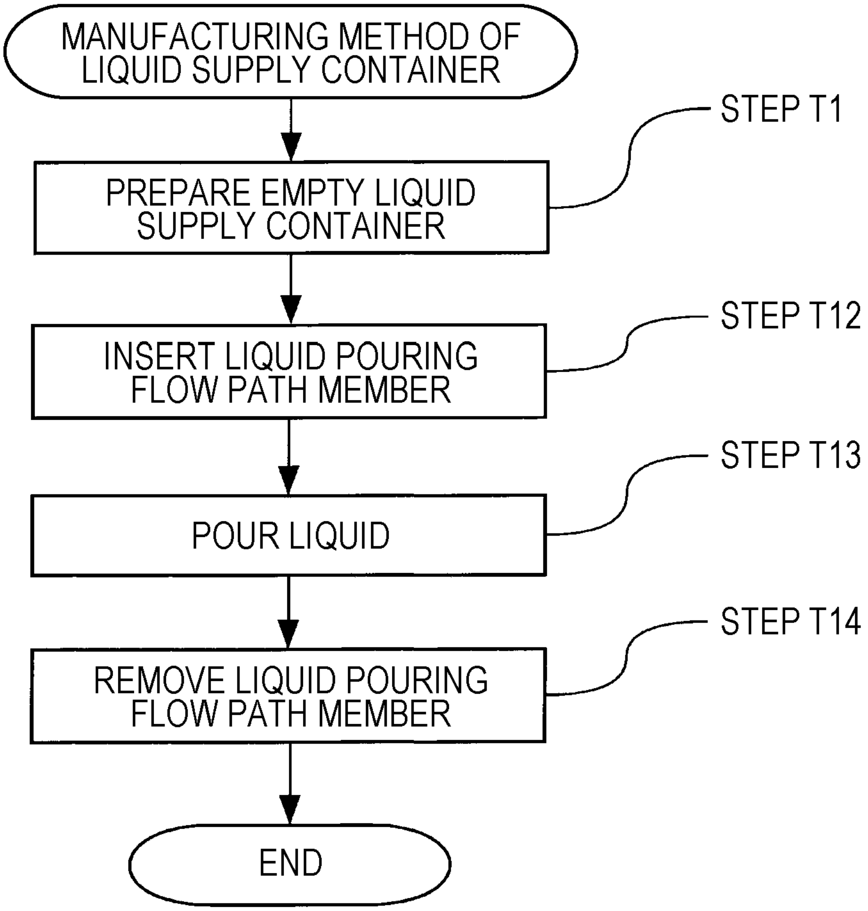
FIG. 11 is a process drawing illustrating a method of manufacturing a liquid supply container.

A method of manufacturing a liquid supply container filled with liquid will be described with reference to FIG. 11. In order to manufacture the liquid supply container containing the liquid inside, first, the liquid supply container 20 or 20B of the first embodiment or the second embodiment is prepared (step T1). The following description will be made on the assumption that the liquid supply container 20 of the first embodiment is used. As the liquid supply container 20, an empty one, that is, a new one is prepared. The preparation of the liquid supply container 20 may be manually performed, or the liquid supply container 20 packed in advance in a storage device may be sequentially taken out by a component transport device or the like to be disposed at a predetermined position.

Next, the liquid pouring flow path member 70 is inserted into the inlet/outlet portion 35 from the seal member 49 of the liquid supply container 20 (step T12). Each step including the insertion of the liquid pouring flow path member 70 can be realized by a robot or the like. In this case, various processes may be realized by creating an operation program of the robot, storing the operation program in a memory or the like, sequentially executing the program by the CPU, and driving a working arm or the like of the robot. The same applies to the following steps.

By inserting the liquid pouring flow path member 70 into the inlet/outlet portion 35, as described above with reference to FIG. 6, the valve body 45 is pushed down and separated from the seal member 49, and thus the valve 40 becomes in the open state. Therefore, in this state, a predetermined amount of liquid is poured (step T13). As a matter of course, the weight of the liquid supply container 20 may be monitored, and the pouring of the liquid may be continued until a predetermined weight is reached. When the pouring of the liquid is completed, the liquid pouring flow path member 70 is pulled out and removed (step T14). Thus, the manufacture of the liquid supply container 20 is completed.

According to the manufacturing method of the liquid supply container 20 described above, the liquid pouring flow path member 70 has the liquid flow path 71 into which the liquid flows and the gas flow path 72 for discharging the gas in the storage portion 22, and the lower end 76 of the gas flow path 72 of the liquid pouring flow path member 70 is positioned at an upper position than the lower end 75 of the liquid flow path 71 in a liquid pouring posture in which the liquid pouring flow path member 70 is inserted inside the liquid supply container 20 and the valve body 45 is separated from the seal member 49, in a state where the inlet/outlet portion 35 faces upward. In addition, in the liquid pouring posture, the lower end 76 of the gas flow path 72 of the liquid pouring flow path member 70 is positioned in one portion of the void portion 36 divided by the upper rib 32 and the holder rib 46. On the other hand, the lower end 75 of the liquid flow path 71 is positioned in the other divided portion. Therefore, in the above-described step T13 of pouring the liquid, it is possible to suppress a concern that liquid droplets of the ink discharged from the lower end 75 block the gas flow path 72 of the liquid pouring flow path member 70 even for a moment in accordance with the pouring of the liquid through the liquid flow path 71 of the liquid pouring flow path member 70, and the discharge of the gas through the gas flow path 72 is not easily hindered. As a result, it is possible to complete step T13 of pouring the ink through the liquid flow path 71 in a short time, it is possible to complete the manufacturing of the liquid supply container 20 in a short time, and since it is not necessary to cope with the blocking of the gas flow path 72, the manufacturing can be simplified. The above-described operation and effects are the same also in the case of using the liquid supply container 20B of the second embodiment.

E. Fifth Embodiment—Manufacturing Method Using Used Liquid Supply Container

Figure 12:
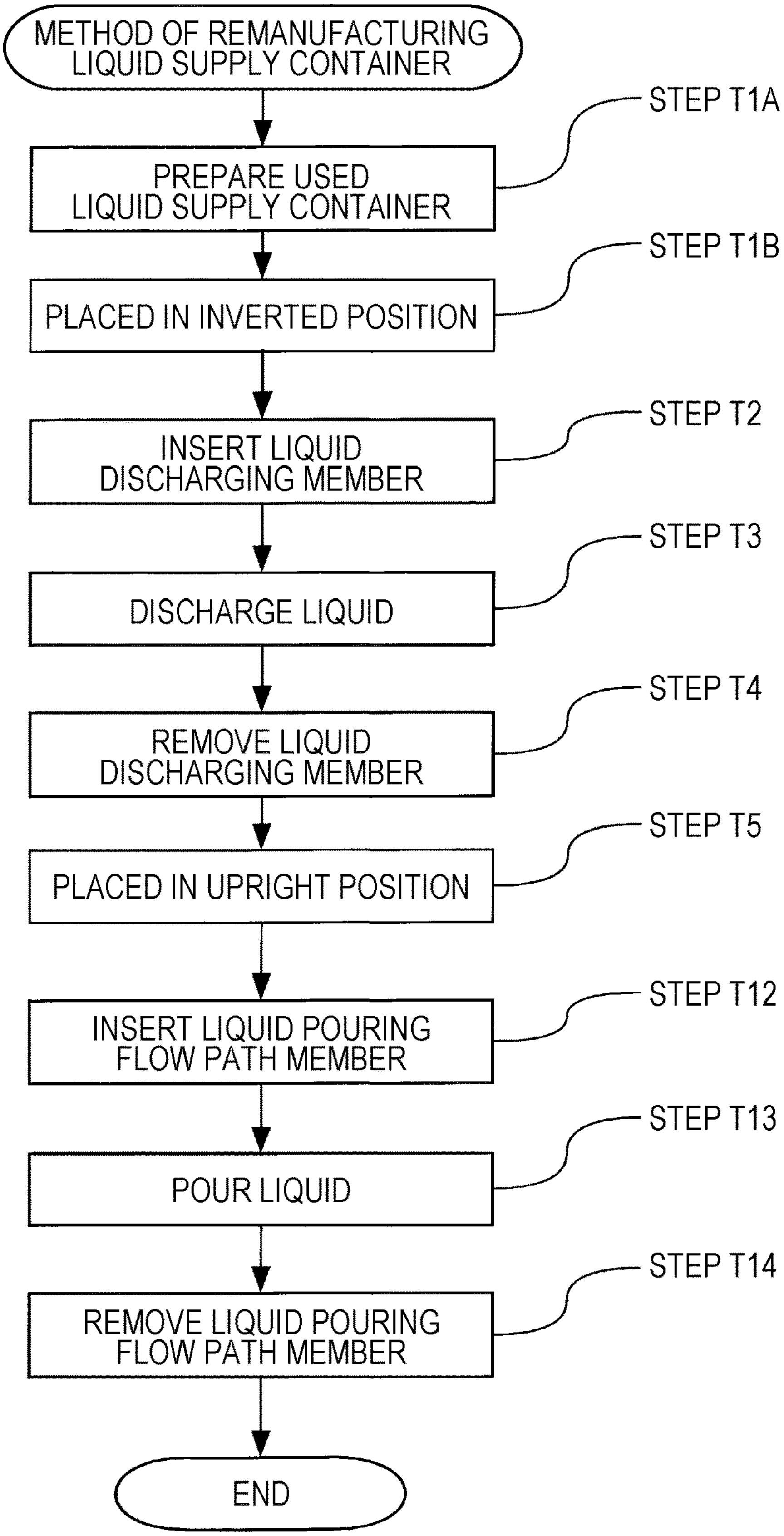
FIG. 12 is a process drawing illustrating a method of remanufacturing a liquid supply container by using a used liquid supply container.

Next, a method of remanufacturing a liquid supply container by using a used liquid supply container will be described with reference to FIG. 12. In order to remanufacture a liquid supply container by using a used liquid supply container, first, the liquid supply container 20C of the third embodiment is prepared (step T1A). As the liquid supply container 20C, a used one, that is, one in which ink may remain, is prepared. Next, the liquid supply container 20C is held in an inverted posture (step T1B).

The valve-opening discharge needle 90 as a liquid discharging member is inserted from the seal member 49 into the inlet/outlet portion 35 of the liquid supply container 20C in the inverted posture (step T2). As a result, as described above with reference to FIG. 9, the valve body 45 is pushed up and separated from the seal member 49, and thus the valve 40 becomes in the open state. Therefore, in this state, the liquid inside the liquid supply container 20C, the unused ink, and the cleaning liquid when cleaning is performed are discharged (step T3). When it is determined that the predetermined time has elapsed and the discharge of the liquid is completed, the valve-opening discharge needle 90 is pulled out and removed (step T4). In this way, the discharge of the liquid remaining in the liquid supply container 20C is completed. Thereafter, the liquid supply container 20 is returned to the upright posture (step T5).

The subsequent steps are the same as those in the fourth embodiment, in which the liquid pouring flow path member 70 is inserted into the inlet/outlet portion 35 from the seal member 49 of the liquid supply container 20C (step T12), and a predetermined amount of liquid is poured (step T13) while the valve 40 is in the open state. Thereafter, when the pouring of the liquid is completed, the liquid pouring flow path member 70 is pulled out and removed (step T14). Thus, the remanufacturing of a liquid supply container by using the used liquid supply container 20C is completed.

According to the method of remanufacturing a liquid supply container by using the used liquid supply container 20C described above, in the step (step T3) of discharging the remaining liquid in the inverted posture, when the opening portion 31 side in the moving direction of the valve body 45 is defined as the tip side and the storage portion 22 side is defined as the rear end side, the rear end of the seal member pressing portion 48 is positioned further on the rear end side than the rear end of the seal member 49. Moreover, the rear end of the step portion 34 is positioned further on the rear end side than the rear end of the seal member pressing portion 48. For this reason, in the inlet/outlet portion 35, the surface of the component present on the radially outer side is higher than the surface of the component present on the radially inner side, and thus the remaining liquid easily flows toward the opening portion 31 and is naturally discharged. Therefore, it does not take time and effort to discharge the liquid remaining in the used liquid supply container 20C, and the remanufacturing can be completed in a short time.

F. Other Embodiments

1. Another embodiment of the present disclosure is a form as a liquid supply container. The liquid supply container includes: a storage portion configured to contain liquid; a liquid inlet/outlet portion forming member disposed at an opening end of the storage portion and including a cylindrical portion forming an inlet/outlet portion of the liquid with respect to the storage portion; an valve disposed in the inlet/outlet portion and opening/closing communication between the storage portion and an outside; a holder member attached to an inside of the cylindrical portion and movably accommodating at least a valve body of the valve; and a seal member disposed in the liquid inlet/outlet portion forming member and constituting the valve together with the valve body, the valve body configured to be moved away from the seal member to make an opening portion communicating with the outside be in an open state and configured to be seated on the seal member to make the opening portion be in a closed state. Here, the cylindrical portion of the liquid inlet/outlet portion forming member forms, between the cylindrical portion and the holder member, a void portion surrounding the holder member in a circumferential direction, and a rib is disposed in the void portion, the rib configured to perform division of the void portion into at least two portions in the circumferential direction. With this configuration, since the void portion can be divided into at least two portions, when the liquid is poured while making the valve be in the open state, it is possible to limit a range, which is accidentally affected by the liquid in the void portion, to the portion divided by the rib. For example, when the gas in the storage portion is discharged at the same time as the pouring of the liquid to balance the pressure in the liquid supply container, it is possible to suppress an adverse effect that liquid droplets which may be generated from the poured liquid affect the discharge of the gas. For example, the liquid droplets may clog a gas flow path for discharging the gas to break the balance of the pressure, which leads to a delay of the pouring of the liquid.

2. In the above-described configuration, the rib may be extended from at least one of the holder member and the cylindrical portion, and may be formed at a position where the void portion is divided into the at least two portions. In this way, the division of the void portion can be easily realized. The ribs may be extended from the holder member side and the cylindrical portion side at the same position, but for example, the ribs may be extended from the holder member side and the cylindrical portion side at every other position and divide the void portion. Of course, the rib may be provided as a dedicated member independently of the holder member and the cylindrical portion. The shapes of the ribs may all be the same or may be different. Further, the material is not particularly limited. The rib itself may have any shape and may be formed in any direction as long as the rib can divide the void portion into at least two portions. For example, the rib may be formed of a flat surface or a curved surface. Further, it may be formed in parallel to the direction of the valve body or may be formed at a predetermined angle.

3. Another one of the other embodiments of the present disclosure is a form as a liquid supply container. The liquid supply container includes: a storage portion configured to contain liquid, a liquid inlet/outlet portion forming member disposed at an opening end of the storage portion and including a cylindrical portion forming an inlet/outlet portion of the liquid; an valve disposed in the inlet/outlet portion and opening/closing communication between the storage portion and an outside; a holder member attached to an inside of the cylindrical portion and movably accommodating at least a valve body of the valve, and a seal member provided in the liquid inlet/outlet portion forming member and constituting the valve together with the valve body, the valve body configured to be moved away from the seal member to make an opening portion communicating with the outside be in an open state and configured to be seated on the seal member to make the opening portion be in a closed state. Here, the cylindrical portion of the liquid inlet/outlet portion forming member forms a void portion surrounding the holder member in a circumferential direction between the cylindrical portion and the holder member, and a flange portion is disposed in the void portion, the flange portion configured to perform division of the void portion into at least two portions in a moving direction of the valve body. With this configuration, the same operation and effects as those of configuration 1 are achieved.

In the above-described configurations 1 to 3, the cylindrical portion of the liquid inlet/outlet portion forming member may have any tubular shape capable of forming the void portion, and may have a cylindrical shape or another shape such as a rectangular tubular shape. The holder member only needs to movably accommodate at least the valve body, and may also accommodate an elastic body such as a spring that biases the valve body in a direction of the seal member, a spring receiver, and the like. The valve body may receive the biasing force in the direction of the seal member in a default state, and may be biased by a magnetic force instead of the elastic body. The rib or the flange portion may be provided in any number, that is, two or more, as long as the void portion can be divided into at least two portions. The division of the void portion by the rib or the flange portion may be one completely partitioning the space. Forming the divided portion; however, makes it possible to narrow a range accidentally affected by the liquid present in the void portion so that the division may be performed in a state in which a certain amount of gap or flow path is interposed. Only one of the rib and the flange portion may be provided, or both of them may be provided.

4. In the above configuration 3, the flange portion may be extended from at least one of the holder member and the cylindrical portion, and may be formed at a position where the void portion is divided into the at least two portions. In this way, the division of the void portion can be easily realized. The flange portions may be provided at the same position so as to surround the holder member, or may be provided, for example, at different heights for every half circumference so as to divide the void portion. Of course, the flange portion may be provided as a dedicated member independently of the holder member and the cylindrical portion. When a plurality of flange portions is provided, the shapes of the flange portions may all be the same or may be different. Further, the material is not particularly limited. The flange portion may divide the void portion into at least two portions, and the shape of the flange portion itself, the direction of formation, and the like are also selected appropriately. For example, the flange portion may be formed of a flat surface or a curved surface. Further, it may be formed perpendicularly to the direction of the valve body, or may be formed with a predetermined gradient.

5. In the above configurations 1 to 4, in a valve open state of the valve, the rib or the flange portion may be positioned between the seal member and the valve body in an unseating state in the moving direction. Therefore, since it is supposed that the liquid is poured between the seal member and the valve body in the unseated state in the moving direction of the valve body while the valve is in the open state, when the rib or the flange portion is provided at this position, it is possible to efficiently limit a range accidentally affected by the liquid present in the void portion. Of course, the rib or the like may be provided beyond this range, or may be provided at a position different from this range as long as the void portion can be divided into a plurality of portions.

6. Still another one of the other embodiments of the present disclosure is a form as a liquid supply container. The liquid supply container includes: a storage portion configured to contain liquid; a liquid inlet/outlet portion forming member disposed at an opening end of the storage portion and including a cylindrical portion forming an inlet/outlet portion of the liquid; a valve disposed in the inlet/outlet portion and opening/closing communication between the storage portion and an outside; a holder member attached to an inside of the cylindrical portion and movably accommodating at least a valve body of the valve; and a seal member disposed in the liquid inlet/outlet portion forming member and constituting the valve together with the valve body, the valve body configured to be moved away from the seal member to make an opening portion communicating with the outside be in an open state and configured to be seated on the seal member to make the opening portion be in a closed state. Here, the liquid inlet/outlet portion forming member includes a step portion, the step portion configured to form a recessed portion 50 accommodating the seal member on a side opposite to a joining portion with the storage portion, the holder member includes a seal member pressing portion that is secured to an inner peripheral wall of the recessed portion 50, the seal member pressing portion configured to press down the seal member accommodated in the recessed portion 50, and when a side closer to the opening portion in a moving direction of the valve body is defined as a tip side and a side closer to the storage portion is defined as a rear end side, a rear end of the seal member pressing portion is positioned further on the rear end side than a rear end of the seal member and a rear end of the step portion is positioned further on the rear end side than the rear end of the seal member pressing portion. With this configuration, the liquid in the storage portion is easily discharged to the outside, and the liquid is less likely to remain in the liquid supply container. Here, at least one rear end side of the respective portions may be inclined so as to become lower toward the center. In addition, the surface of the at least one rear end side of the respective portions may be treated to make the liquid easy to slip in order to make the liquid hard to remain.

7. One embodiment of the method according to the present disclosure is a form as a manufacturing method of a liquid supply container. A method of manufacturing a liquid supply container includes: preparing the liquid supply container having the above-described configurations 1 to 6; inserting a liquid pouring flow path member into the inlet/outlet portion of the liquid supply container; and pouring the liquid in a state where the valve body of the valve is moved away from the seal member by the insertion of the liquid pouring flow path member. Here, the liquid pouring flow path member has a liquid flow path through which the liquid flows and a gas flow path for discharging the gas from the storage portion, in the state where the inlet/outlet portion faces upward, a lower end of the gas flow path of the liquid pouring flow path member is positioned at an upper position than a lower end of the liquid flow path in a liquid pouring posture in which the liquid pouring flow path member is inserted inside the liquid supply container to move the valve body away from the seal member, in the liquid pouring posture, the lower end of the gas flow path of the liquid pouring flow path member is positioned in a first portion that is obtained by the division and the lower end of the liquid flow path is positioned in a second portion that is obtained by the division and different from the first portion, and in the step of pouring the liquid, the gas is discharged from the storage portion through the gas flow path of the liquid pouring flow path member along with the pouring of the liquid through the liquid flow path of the liquid pouring flow path member. In this way, since it is possible to make it less likely to be accidentally affected by the liquid poured at the time of manufacturing the liquid supply container, it is easy to reduce the time and effort required for manufacturing.

8. In the above-described manufacturing method 7, the liquid pouring flow path member may be formed by sectioning the inside of a single pipe member along a pipe into one used as the liquid flow path and the other used as the gas flow path. In this way, it is possible to make the external shape of the liquid pouring flow path member simple, and it is possible to easily insert the liquid pouring flow path member into the liquid supply container. Of course, the liquid pouring flow path member may be formed by joining two pipes. The cross-sectional areas of the liquid flow path and the gas flow path do not need to be the same, and may be a flow path cross-sectional area that satisfies the amount of liquid to be poured and the amount of gas to be discharged corresponding thereto. The lower end of the liquid flow path and the lower end of the gas flow path may be opened in the flow path direction as they are, or may be opened in a shape in which the discharge direction of the liquid and a suction direction of the gas are brought close to the radial direction. The tips may be bent as long as the liquid and the gas can pass through the opening portions. Further, an additional opening may be provided at an upper position than the lower end.

9. Another embodiment of the method according to the present disclosure is a method of remanufacturing a liquid supply container by using a used liquid supply container. The remanufacturing method includes: preparing the liquid supply container according to 1 to 6; inserting a liquid discharging member into the inlet/outlet portion of the liquid supply container; discharging a residual liquid remaining in the liquid supply container by placing the liquid supply container with the liquid discharging member inserted therein in a liquid discharge posture in which the storage portion is positioned at a position higher than the seal member; inserting a liquid pouring flow path member into the inlet/outlet portion of the liquid supply container by placing the liquid supply container in a liquid pouring posture in which the storage portion is at a position lower than the seal member after the liquid discharging member is removed; and pouring the liquid in a state in which the valve body of the valve is moved away from the seal member by the insertion of the liquid pouring flow path member. Here, in the step of discharging the residual liquid, the residual liquid remaining on the step portion of the liquid supply container is guided to the rear end side of the seal member pressing portion positioned further on the tip side than the rear end of the step portion, and the residual liquid remaining on the seal member pressing portion is guided to the rear end side of the seal member positioned further on the tip side than the rear end of the seal member pressing portion to be discharged to the outside from the opening portion. In this way, when a liquid supply container is remanufactured by using the used liquid supply container, the liquid remaining in the liquid supply container can be easily discharged, and therefore, the time and effort required for the remanufacturing can be reduced.

10. In each of the above-described embodiments, a part of the configuration realized by hardware may be replaced with software. At least a part of the configuration realized by software can also be realized by a discrete circuit configuration. In addition, when some or all of the functions of the present disclosure are realized by software, the software (computer program) can be provided in a form stored in a computer-readable recording medium. The "computer-readable recording medium" is not limited to a portable recording medium such as a flexible disk or a CD-ROM, and also includes an internal storage device in a computer such as various RAMs or ROMs, or an external storage device fixed to a computer such as a hard disk. That is, the "computer-readable recording medium" has a broad meaning including any recording medium capable of fixing a data packet not temporarily.

The present disclosure is not limited to the above-described embodiments, and can be realized by various configurations within a range not departing from the gist of the present disclosure. For example, the technical features in the embodiments corresponding to the technical features in the forms described in the summary of the disclosure can be appropriately replaced or combined in order to solve a part or all of the problems described above or in order to achieve a part or all of the effects described above. In addition, when the technical features are not described as essential in this specification, the technical features can be appropriately deleted.

What is claimed is:

1. A liquid supply container comprising:

a storage portion configured to contain liquid;

a liquid inlet/outlet portion forming member disposed at an opening end of the storage portion and including a cylindrical portion forming an inlet/outlet portion of the liquid with respect to the storage portion;

a valve disposed in the inlet/outlet portion and opening/closing communication between the storage portion and an outside;

a holder member attached to an inside of the cylindrical portion and movably accommodating at least a valve body of the valve; and a seal member disposed in the liquid inlet/outlet portion forming member and constituting the valve together with the valve body, the valve body configured to be moved away from the seal member to make an opening portion communicating with the outside be in an open state and configured to be seated on the seal member to make the opening portion be in a closed state, wherein the cylindrical portion of the liquid inlet/outlet portion forming member forms a void portion surrounding the holder member in a circumferential direction between the cylindrical portion and the holder member, and a rib is disposed in the void portion and is comprised of at least a first rib portion formed inside the holder member and/or a second rib portion formed on an inner side of the liquid inlet/outlet portion forming member configured to perform division of the void portion into at least two portions in the circumferential direction, wherein the first rib portion and the second rib portion face each other via a tight clearance.

2. The liquid supply container according to claim 1, wherein the rib is extended from at least one of the holder member and the cylindrical portion, and is formed at a position in which the void portion is divided into the at least two portions.

3. The liquid supply container according to claim 1, wherein in a valve open state of the valve, the rib or a flange portion is positioned between the seal member and the valve body in an unseated state in the moving direction.

4. A method of manufacturing a liquid supply container comprising:

preparing the liquid supply container according to claim 1;

inserting a liquid pouring flow path member into the inlet/outlet portion of the liquid supply container; and pouring the liquid in a state where the valve body of the valve is moved away from the seal member by insertion of the liquid pouring flow path member, wherein the liquid pouring flow path member has a liquid flow path through which the liquid flows and a gas flow path for discharging gas from the storage portion, and in a state where the inlet/outlet portion faces upward, a lower end of the gas flow path of the liquid pouring flow path member is positioned at an upper position than a lower end of the liquid flow path in a liquid pouring posture in which the liquid pouring flow path member is inserted inside the liquid supply container to move the valve body away from the seal member, in the liquid pouring posture, the lower end of the gas flow path of the liquid pouring flow path member is positioned in a first portion that is obtained by the division, and the lower end of the liquid flow path is positioned in a second portion that is obtained by the division and different from the first portion, and in the pouring the liquid, the gas is discharged from the storage portion through the gas flow path of the liquid pouring flow path member along with the pouring of the liquid through the liquid flow path of the liquid pouring flow path member.

5. The method of manufacturing a liquid supply container according to claim 4, wherein the liquid pouring flow path member is formed by sectioning an inside of a single pipe member along a pipe into one used as the liquid flow path and another used as the gas flow path.

6. The liquid supply container according to claim 1, wherein the void portion includes at least a first void portion and a second void portion that is different and separate from the first void portion, and the liquid flows in the first void portion while air flows in the second void portion.

7. A liquid supply container comprising:

a storage portion configured to contain liquid;

a liquid inlet/outlet portion forming member disposed at an opening end of the storage portion and including a cylindrical portion forming an inlet/outlet portion of the liquid;

a valve disposed in the inlet/outlet portion and opening/closing communication between the storage portion and an outside;

a holder member attached to an inside of the cylindrical portion and movably accommodating at least a valve body of the valve; and a seal member disposed in the liquid inlet/outlet portion forming member and constituting the valve together with the valve body, the valve body configured to be moved away from the seal member to make an opening portion communicating with the outside be in an open state and configured to be seated on the seal member to make the opening portion be in a closed state, wherein the cylindrical portion of the liquid inlet/outlet portion forming member forms a void portion surrounding the holder member in a circumferential direction between the cylindrical portion and the holder member, and a flange portion is disposed in the void portion and is part of the holder member or formed on an inner wall of the cylindrical portion, and between the valve body and the seal member, configured to perform division of the void portion into at least two portions in a moving direction of the valve body.

8. The liquid supply container according to claim 7, wherein the flange portion is extended from at least one of the holder member and the cylindrical portion, and is formed at a position in which the void portion is divided into the at least two portions.

9. A liquid supply container comprising:

a storage portion configured to contain liquid;

a liquid inlet/outlet portion forming member disposed at an opening end of the storage portion and including a cylindrical portion forming an inlet/outlet portion of the liquid;

a valve disposed in the inlet/outlet portion and opening/closing communication between the storage portion and an outside;

a holder member attached to an inside of the cylindrical portion and movably accommodating at least a valve body of the valve; and a seal member disposed in the liquid inlet/outlet portion forming member and constituting the valve together with the valve body, the valve body configured to be moved away from the seal member to make an opening portion communicating with the outside be in an open state and configured to be seated on the seal member to make the opening portion be in a closed state, wherein the liquid inlet/outlet portion forming member includes a step portion, the step portion configured to form a recessed portion accommodating the seal member on a side axially opposite to an attachment portion that is attached to the storage portion, the holder member includes a seal member pressing portion secured to an inner peripheral wall of the recessed portion, the seal member pressing portion configured to press down the seal member accommodated in the recessed portion, and when a side closer to the opening portion in a moving direction of the valve body is defined as a tip side and a side closer to the storage portion is defined as a rear end side, a rear end of the seal member pressing portion is positioned further on the rear end side than a rear end of the seal member, and a rear end of the step portion is positioned further on the rear end side than the rear end of the seal member pressing portion.

10. A method of remanufacturing a liquid supply container by using a used liquid supply container, the method comprising:

preparing the liquid supply container according to claim 9;

inserting a liquid discharging member into the inlet/outlet portion of the liquid supply container;

discharging a residual liquid remaining in the liquid supply container by placing the liquid supply container into which the liquid discharging member is inserted in a liquid discharge posture in which the storage portion is at a position higher than the seal member;

inserting a liquid pouring flow path member into the inlet/outlet portion of the liquid supply container by placing the liquid supply container in a liquid pouring posture in which the storage portion is at a position lower than the seal member after the liquid discharging member is removed; and pouring the liquid in a state where the valve body of the valve is moved away from the seal member by insertion of the liquid pouring flow path member, wherein in the discharging the residual liquid, a residual liquid remaining on the step portion of the liquid supply container is guided to a rear end side of the seal member pressing portion positioned further on a tip side than the rear end of the step portion, and a residual liquid remaining on the seal member pressing portion is guided to a rear end side of the seal member positioned further on the tip side than the rear end of the seal member pressing portion to be discharged to an outside from the opening portion.

* * * * *